APPARATUS FOR APPLYING AND SEVERING PRESSURE SENSITIVE TAPE

Filed June 14, 1966 Sheet 1 of 4

INVENTOR
ROBERT DONALD FRANZENE
BY Bair, Freeman & Molinare
ATTORNEYS

APPARATUS FOR APPLYING AND SEVERING PRESSURE SENSITIVE TAPE

Filed June 14, 1966

INVENTOR
ROBERT DONALD FRANZENE
BY Bair, Freeman & Molinare
ATTORNEYS

INVENTOR
ROBERT DONALD FRANZENE
BY Bair Freeman & Molinare
ATTORNEYS

INVENTOR
ROBERT DONALD FRANZENE
BY Bair, Freeman & Molinare
ATTORNEYS

3,454,452
APPARATUS FOR APPLYING AND SEVERING PRESSURE SENSITIVE TAPE

Robert Donald Franzene, Chicago, Ill., assignor to Kaufmann Tool and Engineering Corp., a corporation of Illinois Filed June 14, 1966, Ser. No. 557,454
Int. Cl. B32b *31/08, 31/10, 31/00*
U.S. Cl. 156—518 12 Claims This invention relates to uniquely designed apparatus for consecutively severing a piece of tape from an elongated strip, as a roll, of pressure sensitive tape and then applying the tape to a surface.

Pressure sensitive tape is used today for a wide variety of uses. Most pressure sensitive tape is stored on rolls of tape. Pieces of the tape roll are first severed and are then applied to a surface. Depending upon the particular application, the quantity of tape pieces required over a period of time varies greately. Pressure sensitive tape may be used as labels and merely applied to the surface of an envelope or a box; the tape may also be used to join two pieces of material. In cases where many pieces of tape are applied to a surface or surfaces, the industrial tape user encounters a significant labor problem since there is no known machine which can rapidly and efficiently sever and apply pieces of pressure sensitive tape. It is recognized that there are machines available which sever tape strips from a tape roll, but there is no known apparatus which will also rapidly and immediately apply the severed tape strips to a surface. Thus, there would be a great saving in time and labor if apparatus could be provided which would not only rapidly and efficiently sever consecutive pieces of tape from a tape roll but which would also rapidly and efficiently apply the thus severed tape pieces to a surface.

It is therefore an important object of this invention to provide unique apparatus for consecutively severing pieces of tape from a tape strip, as a tape roll, and then applying the severed tape pieces to a surface.

It is also an object of this invention to provide novel apparatus for rapidly, efficiently, and consecutively severing tape pieces from a pressure sensitive tape roll and immediately thereafter applying the severed tape pieces to a surface.

It is a further object of this invention to provide improved apparatus which severs and applies consecutive individual pressure sensitive tape pieces wherein the apparatus is particularly characterized by its simplicity and economy of construction, manufacture, and operation.

It is another object of this invention to provide uniquely constructed apparatus for severing and applying individual strips of tape to a surface wherein the apparatus is characterized by its efficiency in its operation.

Further purposes and objects of this invention will appear as the specification proceeds.

One particular embodiment of the present invention is illustrated in the accompanying drawings wherein.

Figures 1, 1A:
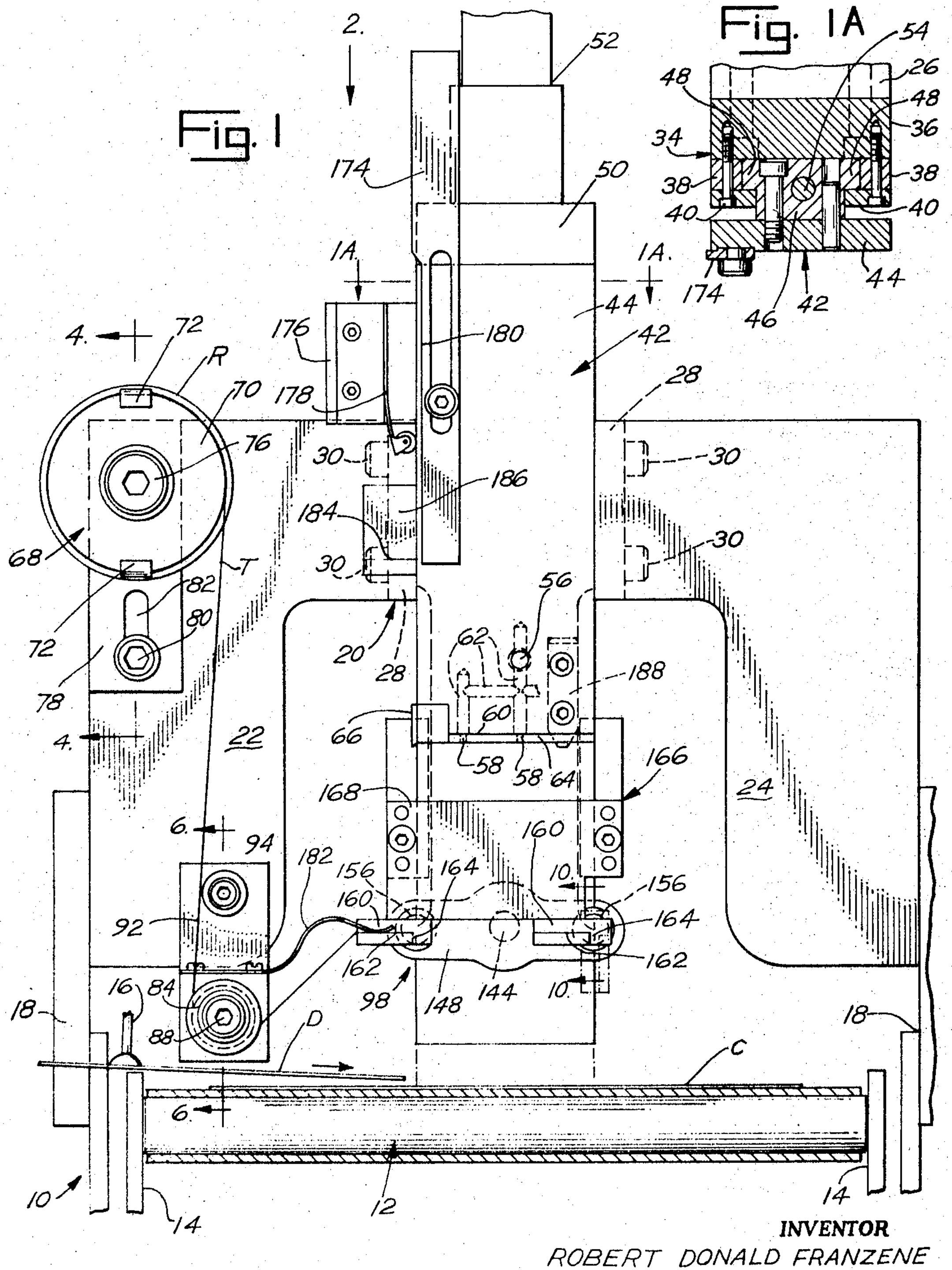
FIGURE 1 is a front elevational view of the novel apparatus for severing and applying pressure sensitive tape.
FIGURE 1A is a sectional view taken along the line 1A—1A of FIGURE 1.

For purposes of simplicity in this specification, the use of the apparatus, generally 10, for severing pieces of pressure sensitive tape from a strip or roll of tape will relate to the application of the tape pieces to pieces of paper or cardboard for holding the pieces to a larger piece of paper or cardboard. It is to be understood, however, that the apparatus 10 may be used for a variety of applications, where pieces of pressure sensitive tape are consecutively cut from a roll and then applied to any surface for practically any purpose.

The tape severing and applying apparatus 10 is mounted over a conveyor, generally 12. The conveyor 12 is positioned in a horizontal plane by a framework 14. The conveyor 12 carries material to which the pressure tape T is applied, and may be, for example, an enlarged piece of cardboard C. As viewed from the front view of the apparatus 10, the conveyor is moved inwardly or outwardly relative to the paper. A vacuum feeder or conveyor 16 may be used for transferring smaller cards D in a direction lateral to the movement of the conveyor 12 and into position upon the large cardboard member C. A piece of tape is then to be applied as a hinge joining the card D to the member C in a manner to be hereinafter described.

A pair of spaced upright and substantially parallel support members 18 provide a rigid mounting for the apparatus 10. The taping head, generally 20, includes a pair of oppositely extending substantially L-shaped support plate members 22 and 24 which are rigidly mounted on the spaced upright frame members 18. The plates 22 and 24 are upright and are rigidly secured to the opposite sides 25 of an upright support member 26. Each of the plate members 22 and 24 has a transverse mounting plate 28 welded to the surface of its upper side edge. The transverse plates 28 are in turn rigidly secured to the opposite sides of the upright support member 26 by bolts 30 and dowels 32.

Figure 2:
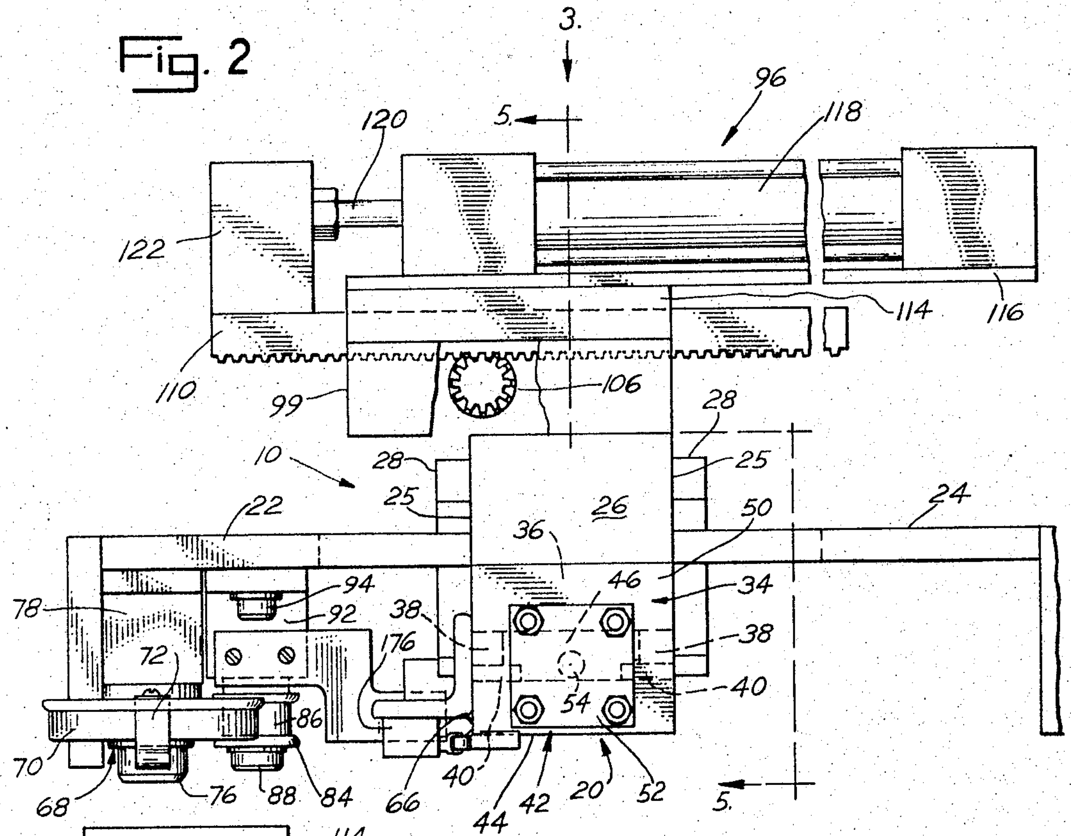
FIGURE 2 is a top plan view of the embodiment of FIGURE 1.
Figures 5, 6, 7:
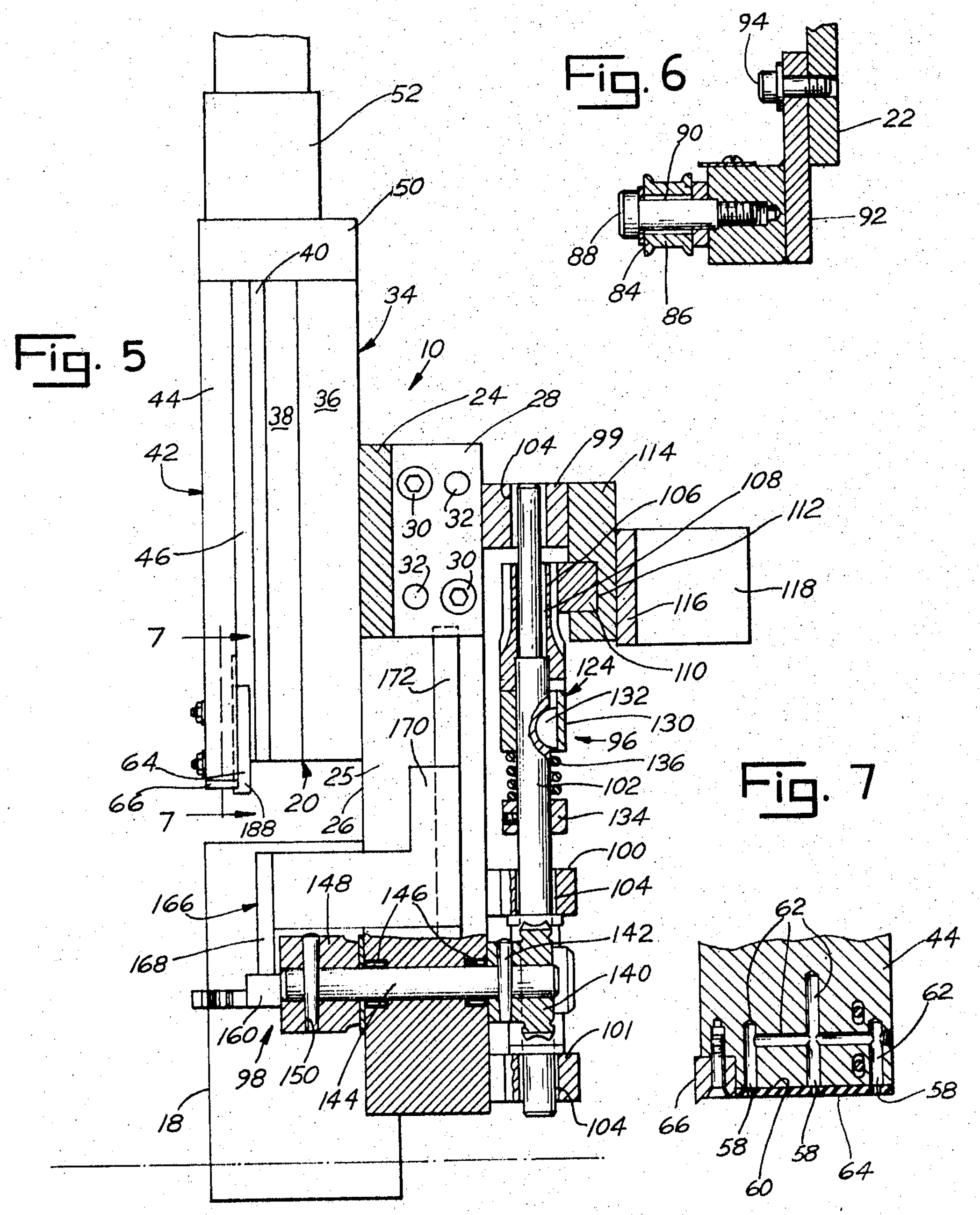
FIGURE 5 is a cross-sectional view of the embodiment of FIGURE 2 taken along the line 5—5 of FIGURE 2.
FIGURE 6 is a cross-sectional view of the tape guide roller taken along the line 6—6 of FIGURE 1.
FIGURE 7 is a fragmentary sectional view of the interior of the ram taken along the line 7—7 of FIGURE 5.

A ram guide assembly, generally 34, is rigidly secured to the front wall of the upright support member 26, as most clearly seen in FIGURES 1A, 2, and 5. The ram guide assembly 34 includes an elongated rear plate 36, a pair of narrow elongated bars 38 longitudinally secured to the lateral edges of the rear plate 36, and a pair of elongated inwardly extending plates 40 secured to the outer surfaces of the elongated plates 38. The rear plate 36, the bars 38, and the guide plates 40, as most clearly seen in FIGURE 1A, thereby define opposed, inwardly opening guide tracks for the ram assembly, generally 42.

The ram assembly 42 includes a front plate 44 and a rear plate 46 fastened thereto. A pair of outwardly extending track engaging portions 48 are integrally formed with the rear plate 46. The track engaging portions 48 engage the tracks defined by the ram guide assembly 34 to provide for smooth vertical reciprocating movement of the ram assembly 42 during the severing and applying of pieces of tape T to the cards D and C.

A support plate 50 is rigidly mounted in a horizontal plane on the upper side of the ram guide assembly 34. A double acting air cylinder 52 is rigidly mounted in a vertical position on the plate 50. The air cylinder 52 has the end of its reciprocating piston rod 54 securely threadably received by a threaded aperture in the rear plate 46 of the ram assembly 42 whereby reciprocating movement is imparted to the ram 42. As air moves the piston (not shown) in oposite paths of travel within the air cylinder 52, the piston rod 54 imparts the desired reciprocating movement to the ram assembly 42, which is guided in this movement by the ram guide assembly 34.

A transverse vacuum opening 56 is provided in the front face of the front plate 44 of the ram assembly 42. Vacuum is applied from a source (not shown) to the opening 56 and then to the vacuum openings 58 in the resilient pad 59 at the bottom 60 of the front ram plate 44. The vacuum openings 58 communicate with the vacuum inlet 56 by interconnecting vacuum channels 62 provided in the plate 44, as clearly seen in FIGURE 7. A resilient pad 64 is mounted along the bottom edge 60 of the ram 42 and the pad 64 also has openings which communicate with the vacuum openings 58 in the ram plate 44.

One lower lateral edge of the ram plate 44 has a knife member 66 mounted thereon. The knife 66 is located on the side of the ram 42 which is closest to the tape supply roll R. As most clearly shown in FIGURE 11, the knife 66 has a toothed or serrated cutting edge and the knife 66 severs the tape T across the width of the tape.

Figure 4:
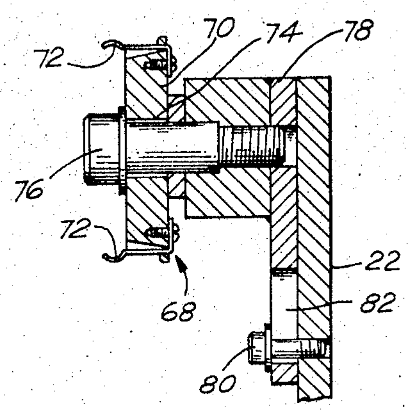
FIGURE 4 is a cross-sectional view of the tape holder taken along the line 4—4 of FIGURE 1.

The roll of pressure sensitive tape R is rotatably carried by a tape holder, generally 68. Referring particularly to FIGURES 1 and 4, the tape holder 68 includes a substantially cylindrical member 70. The inner cylindrical surface of the tape roll R is passed over and is snugly received by the substantially cylindrical outer surface of the cylindrical member 70. In order to snugly hold the tape roll R upon the cylindrical member 70, a pair of radially outwardly biasing leaf spring members 72 are mounted upon the member 70 to bear against the inner cylindrical surface of the tape roll. The cylindrical member 70 is provided with a central aperture in which a journal bearing member 74 is received. A shoulder bolt 76 passes through the aperture and the bearing 74 so that the cylindrical tape holder 70 is rotatably carried by the bolt 76. The bolt 76 is threadably secured to an adjustable support bracket 78. The bracket 78 in turn is adjustably mounted on the plate member 22 by a bolt 80 which passes through a slotted aperture 82 in the lower elongated portion of the bracket 78. When the bolt 80 is loose, the bracekt 78 may be moved vertically up and down in the slot 82 or it may be pivoted so as to provide for proper adjustment of tension of the tape T being fed from the tape roll R to the severing portion of the apparatus 10.

After the tape T passes from the roll R, it passes around a rotatable guide roller 84. The guide roller 84 has a recessed cylindrical outer surface 86 for receiving the tape T. The roller 84 has a central aperture therein. A journal bearing 90 is received in the aperture of the roller 84 and a bolt 88 is passed therethrough for rotatably carrying the roller 84. The bolt 88 is threadably received by a bracket 92 which is secured to the plate member 22 by a bolt 94. By loosening the bolt 94, the bracket 92 and thereby the guide roller 84 may be pivoted. The adjustability of the tape roller 68 and the adjustability of the guide roller 84 for the tape enables proper tension adjustment to be provided for the tape T as it is being fed from the roll R to the severing portion of the apparatus.

Figure 3:
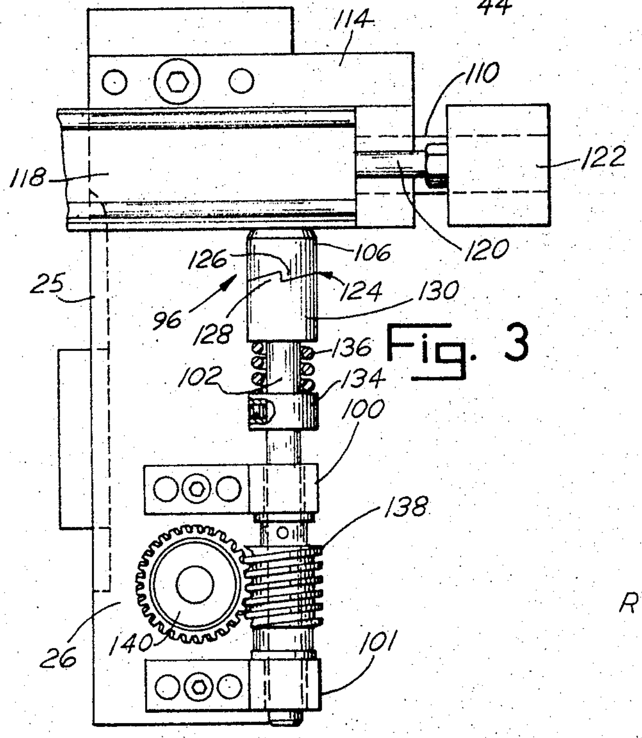
FIGURE 3 is an end elevational view of the embodiment of FIGURE 2.

Referring particularly to FIGURES 2, 3, and 5, a driving mechanism, generally 96, for the tape feeder, generally 98, is shown. Upper, intermediate, and lower shaft support members 99, 100, and 101 are mounted in vertical alignment along the rear surface of the upright support member 26. The shaft support members 99, 100, and 101 rotatably receive a stepped upright shaft 102. Each of the support members 99, 100, and 101 has a central aperture which receives a journal member 104 to provide for the desired rotatable mounting of the vertical shaft 102. The upper portion of the shaft 102 is reduced in diameter and a gear 106 is rotatably mounted therearound. A journal member 108 is interposed between the reduced portion of the shaft 102 and the gear 106 to provide the desired rotatable mounting. The gear 106 meshes with a horizontally mounted driving rack 110. The rack 110 is slidably received within a horizontal recess 112 provided in a rack support plate 114 which is rigidly secured to the upper shaft support 99.

An air cylinder mounting plate 116 is mounted on the outer rear surface of the rack mounting plate 112. A double acting air cylinder 118 is mounted on the plate 116 and is in a horizontal position. The piston rod 120 of the air cylinder 118 is rigidly secured to a plate 122 which in turn is rigidly secured to the rear end portion of the rack 110. Thus, as the double acting air cylinder reciprocates as air is applied thereto, reciprocating movement is imparted to the rack 110 which rotates the gear 106. In a manner to be hereinafter described in greater detail, the rotation of the gear 106 effects rotation of the shaft 102 in one direction only.

The rotation of the shaft 102 in one direction is accomplished by a ratchet connection, generally 124, between the gear 106 and the shaft 102. The lower edge of the gear 106 has teeth 126 which engage teeth 128 on the upper surface of a ratchet member 130, the teeth 126 each having an upright mating surface and a slanted mating surface. The cylindrical ratchet member 130 is affixed to the shaft 102 by a key 132. A collar 134 is mounted on the shaft 102 at a spaced distance below the ratchet member 130. A compression spring 136 is interposed between the collar 134 and the ratchet member 130 so that the teeth of the ratchet 130 are normally biased into engagement with the teeth 126 of the gear 106. The ratchet 130 is keyed to the shaft 102 so as to be radially fixed but slidable longitudinally on the shaft 102. This ratchet connection 124 thereby provides for rotation of the shaft 102 only when the gear 106 is rotated in a direction which moves the upright surfaces of the teeth 126 and 128 into abutting relationship.

A worm gear 138 is fixed to the lower portion of the shaft 102 intermediate the intermediate and lower shaft supports 100 and 101 and meshes with a gear 140. The gear 140 is rigidly secured by a pin 142 to a horizontal forwardly extending shaft 144. The shaft 144 passes through and is rotatably received within an opening through the lower portion of the upright support member 26. Bearing members 146 are positioned in the opening at the front and rear surfaces of the support member 26 to provide the desired rotation for the shaft 144.

The horizontal forwardly extending shaft 144 is rigidly received by a central aperture in the tape feeder plate 148 by a pin 150. As viewed in FIGURE 1, the tape feeder plate 148 is rotatable only in a clockwise direction by the shaft 144, which is driven by the driving mechanism 96.

Figures 9, 10, 11:
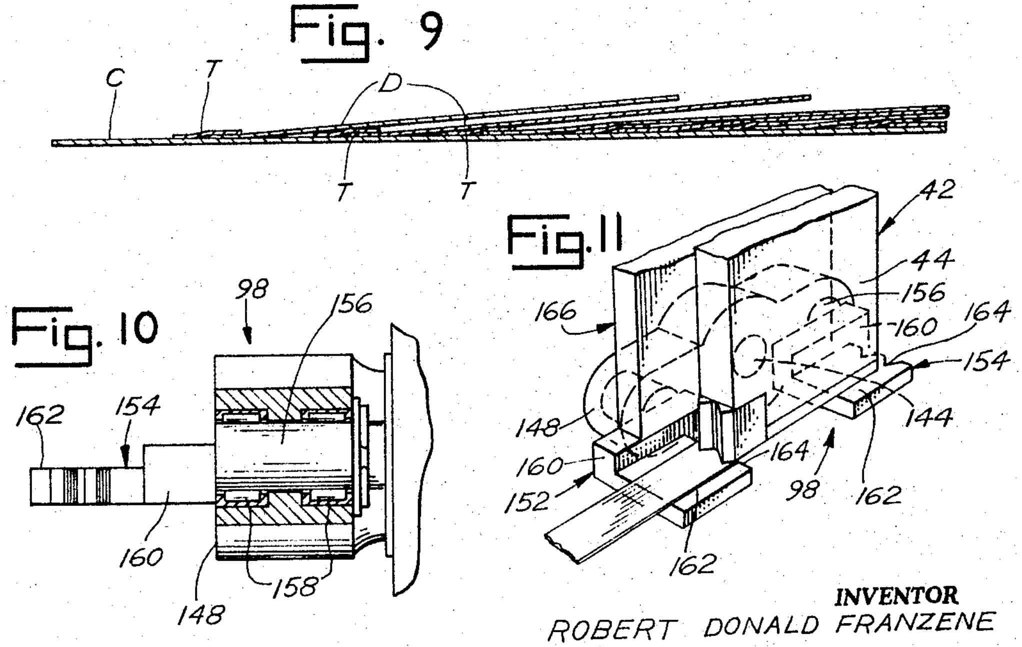
FIGURE 9 is an enlarged sectional view of the embodiment of FIGURE 8 taken along the line 9—9 of FIGURE 8.
FIGURE 10 is an enlarged sectional view of one side of the tape feed plate taken along the line 10—10 of FIGURE 1.
FIGURE 11 is a perspective view showng the pressure sensitive tape just before the apparatus effects the severing of a piece of tape from a roll of pressure sensitive tape.

Referring more particularly to FIGURES 10 and 11, tape feeding and severing members 152 and 154, which are quite important in my construction, are rotatably carried by opposite sides of the tape feeder plate 148. Each member includes an integral cylindrical or shaft portion 156 which is received within suitable openings provided in the sides of the plate 148. Bearings 158 are positioned in the feeder plate apertures to rotatably receive the shaft portion 156. The rotatable members 152 and 154 also include a base portion 160 and a forwardly extending tape receiving portion 162 having a planar upper surface to which the tape T is adhesively secured. The inner edge of the tape portion 162 of the rotatable member 152 and the outer edge of the tape portion 162 of the rotatable member 154 have a knife portion 164 defined thereon which cooperates with the knife 66 on the ram 36 to effect the desired severing or cutting of the tape T. The flippers or rotatable members 152 and 154 each have their faces 162 and cutting edges 164 pivotally carried on the plate 148 by the offset shaft portions 156 so that they do not interfere with the ram 42 during its reciprocal up and down movement. The rotatable member 152 has its knife portion 164 facing inwardly to the space defined between the members 152 and 154 while the rotatable member 154 has its knife edge facing outwardly and away from the space defined between the members 152 and 154.

It is important in my construction that the planar upper surfaces of the tape portions 162 of each of the members 152 and 154 are to be maintained in a substantially horizontal position while the knife edge portions 164 are to be maintained in a substantially vertical position so as to properly cooperate with the knife 66 to effect the severing of the tape. The maintaining of this desired alignment for the rotatable members is accomplished by the action of a freely sliding weight 166. The weight 166 includes an upright front plate 168 which bears against the upper edges of the base portions 160 of each of the members 152 and 154, when the members 152 and 154 are in horizontal alignment. The sliding weight 166 includes a pair of upright opposed side plates 170 which are joined to the opposite ends of the front plate 168. The side plates 170 include inwardly projecting portions (not shown) which engage recessed tracks 172 located on the opposite side walls 25 of the upright support member 26 so as to guide the sliding weight 166. The sliding weight 166 bearing against the base portion of the members 152 and 154 thus maintains the members 152 and 154 in the desired position.

The front ram plate 44 has an elongated switch actuator 174 mounted along one lateral edge. A switch 176 is fixed to one side of the ram guide assembly 34. The switch 176 has an actuating arm 178 with a roller thereon which is aligned with the outer edge of the actuator 174. When the roller on the arm 178 is in a recessed portion 180 of the actuator 174, the air cylinder 118 is in the retracted position shown in FIGURE 2. As the ram assembly 42 moves downwardly, the raised portion on the actuator 174 moves the arm 178 outwardly which actuates the switch 176. When the switch is actuated, an air solenoid valve (not shown) is activated to direct air to one side of the piston (not shown) in the air cylinder 118 to move the piston rod 120 outwardly. This movement imparts horizontal motion to the rack 110 which rotates the gear 106 on the shaft 102. As viewed in FIGURE 2, since the rotation of the gear 106 is in a counterclockwise direction, the teeth 126 and 128 slide relative to each other so that no rotation is imparted to the upright shaft 102. When the ram has caused the severing of the tape T and has applied the cut tape to a cardboard member C, the actuating arm 178 again moves into engagement with the recess 180 of the actuator 174. This causes the air solenoid valve (not shown) to reverse the flow of air to the cylinder 118 and retract the piston rod 120 and rack 110 to the starting position shown in FIGURE 2. During this return movement, clockwise rotation is imparted to the gear 106. The clockwise rotation imparted to the gear 106 causes the gear teeth 126 to engage the teeth 128 of the ratchet 130 and thereby impart rotation to the shaft 102. The worm 138 and worm wheel 140 are also rotated so as to impart the desired clockwise rotation to the forwardly extending horizontal shaft 144.

The tape T must be securely adhered to the tape portion 162 of the rotatable member 152 so as to pull the tape T from the roll R as the shaft 144 rotates the feeder plate 148. In order to assure proper adhesion of the pressure sensitive tape T, a leaf spring 182 is provided to bear against the upper surface of the tape T so as to press the tape T against the tape surface 162. In order to further assure adhesion of the tape T, a resilient tamper 184 is mounted on the lower surface of a support 186 which is mounted on the side of the ram assembly 42. When the ram is moved to the full down position, the resilient tamper 184 presses the tape T firmly against the taping portion 162.

In the operation of my apparatus 10, the operator first places a roll R of pressure sensitive tape T on the tape holder 68. The leading portion of the strip of tape T is pulled from the roll R and the side of the tape without adhesive is passed around the guide roller 84. The leading edge portion of the tape is then manually adhered to the planar tape receiving portions 162 of the members 152 and 154 so that the tape extends across the space between the members 152 and 154, as most clearly seen in FIGURE 11. Although it is necessary to secure the leading edge portion of the tape T only to the rotatable member 152 without passing it across the space between the members 152 and 154, it is preferred that the tape be secured to both the tape receiving portions 162 since one reciprocating movement of the ram assembly 42 would be required before a piece of tape would be applied.

Figure 8:
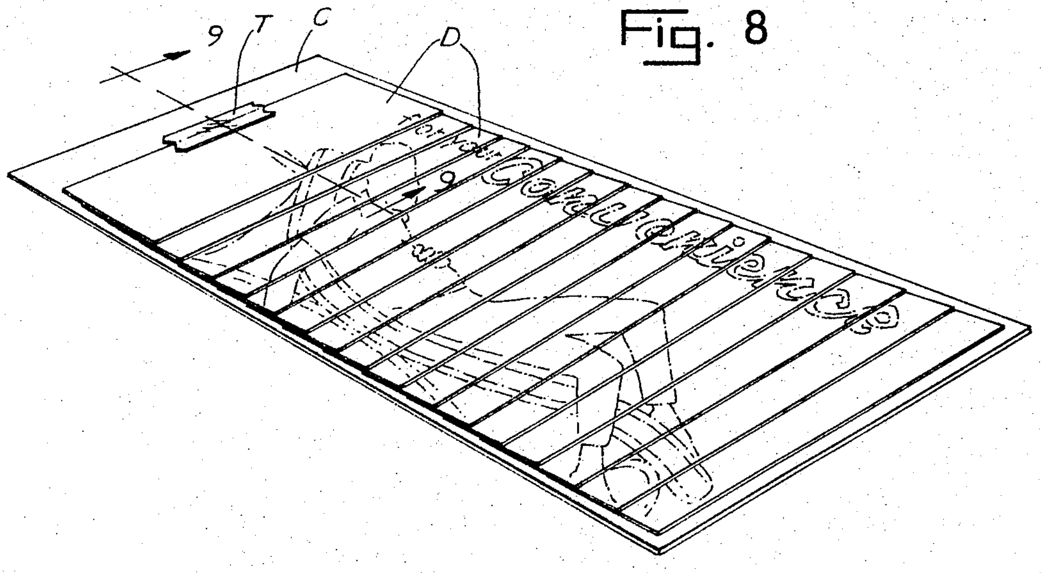
FIGURE 8 is a perspective view illustrating one specific use of the apparatus for severing and applying a piece of pressure sensitive tape.

When the tape is positioned on the rotatable members 152 and 154, the member to which the tape T is applied is positioned directly below the ram assembly 42 upon the conveyor 12, as seen in FIGURE 1. The vacuum feeder 16 feeds a card D to the proper relative position on the card C so that tape applied from the ram 42 secures the display card D to the cardboard member C. In FIGURES 8 and 9, there is illustrated a particular application of our apparatus 10. The apparatus 10 hingedly secures a plurality of overlapping cards D to the card C by severed pieces of pressure sensitive tape T.

When the large card C and the display card D are in proper position and when the tape T is on the tape receiving portions 162 of the rotatable members 152 and 154, the machine 10 is ready to rapidly and consecutively apply severed pieces of tape T to the cardboard C and the card D. A switch (not shown) is operated so that a solenoid valve (not shown) directs air to the piston (not shown) in the air cylinder 52 so as to drive the piston downwardly. The piston rod 54 of the air cylinder 52 is connected to the upper end of the ram assembly 42 so the ram plate 44 is driven downwardly. Referring to FIGURE 11, the apparatus is shown just prior to the time that the ram 44 has reached the level of the tape receiving portions 162 of the rotatable members 152 and 154. The serrated knife 66 on the ram 42 cooperates with the serrated knife edge 164 of the rotatable member 152 to effect the severing of a piece of tape T from the strip of pressure sensitive tape.

The vacuum openings 58 hold the severed tape T to the lower surface of the pad 64. Also, a plate 188 is secured to the side of the ram 44 opposite to the knife 66 for striking the tape receiving portion 162 of the rotatable member 154 lateral of the rotation point of the rotatable member so as to impart rotation to the rotatable member 154 and thereby strip the tape from the tape receiving portion 162 of the member 154 practically simultaneous with the severing operation. Thus, a single piece of tape has been severed from the tape strip while the ram 42 has pivoted one of the rotatable members 154 so as to strip the tape from the tape receiving portion 162 of the rotatable member 154. The rotatable member 154 rotates to the dotted line position shown in FIGURE 1 so as to be out of the way of the ram 42 during its downward movement. During the downward movement of the ram 42, the raised portion of the actuator member 174 actuates the switch 176 so as to move the piston rod 120 of the air cylinder 118 outwardly. This also imparts the desired motion to the rack 110 so as to cock the drive assembly 96. At this time, no rotation has been imparted to the upright shaft 102 due to the ratchet connection 124 between the gear 106 and the shaft 102.

When the ram 42 has reached its full downward position, the bottom of the resilient pad 64 presses the tape T to provide a hinged connection between the cards C and D. In the ram's full down position a switch (not shown) is activated to operate the solenoid valve (not shown) to reverse the air pressure in the double acting air cylinder 52 and drive the ram 42 upwardly. When the tape is applied to the cardboard C and D to provide the hinged connection, the vacuum holding the tape to the ram pad 64 is insufficient to overcome the adhering force of the strip of tape against the cardboard C and the display card D. When the ram has moved to the full down position, the resilient tamper 184 more securely adheres the tape T to the tape receiving portion 162 of the rotatable member 152.

When the ram moves upwardly by action of the air cylinder 52, the actuator arm 178 moves into the recessed portion 180 so that the solenoid valve (not shown) reverses the air pressure in the air cylinder 118 so as to drive the piston 120 and the rack 110 back to the position shown in FIGURE 2. During this retracting movement, the rack imparts clockwise rotation to the gear 106. The clockwise rotation causes the teeth 126 of the gear 106 to engage the teeth 128 of the ratchet member 130. The ratchet member 130, being secured to the shaft 102, imparts rotation in a clockwise direction to the shaft 102. Clockwise rotation of the shaft 102 rotates the worm gear 138 which meshes with the gear 140. The gear 140 rotates the shaft 144 in a counterclockwise direction, as viewed in FIGURE 3, or in a clockwise direction, as viewed in FIGURE 1. At this time, the lower end of the ram assembly 42 is clear of the tape feeder plate 148 which is rotated in a clockwise direction only by the shaft 144.

As the shaft 144 rotates the plate 148, the rotatable member 152 is moved in a substantially circular path so as to pull the tape T across the space between the members 152 and 154 by pulling tape from the roll R. The bottom edge sliding weight 168 maintains the rotatable member 152 in a substantially horizontal position during this movement. During rotation of the plate 148, the rotatable member 154 moves downwardly in a circular path and out of contact with the sliding weight 168. The rotatable member thus becomes freely rotatable and rotates downwardly and is thrown outwardly by centrifugal force imparted thereto by rotation of the plate 148.

As the member moves upwardly in its circular path, its tape receiving portion 162 is moved by centrifugal force into the path of the strip of tape T being pulled by the member 152 and the tape thus becomes adhered thereto. The sliding weight 168 moves back down to contact the base portion 160 of the member 154 after the 180° rotation of the plate 148 has been completed to thereby pivot the rotatable member 154 to the desired horizontal position so that the knife edge 164 will be in proper alignment for effecting the severing operation in cooperation with the knife 56 on the ram 42. As the tape receiving portion 162 of the member 154 receives the tape, the leaf spring 192 provides initial assurance for adherence of the tape T to the rotatable member 154. When the apparatus has again moved to the position shown in FIGURE 1 where the members 152 and 154 are in substantial horizontal alignment (only the positions of the members 152 and 154 being reversed) the air pressure is again reversed in the air cylinder 52 so as to again drive the ram assembly 42 downwardly to start another cycle of operation. Before the ram 42 is driven down, the conveyor 12 is indexed and another card D is fed by the vacuum feeder 16 so as to place a card D in place over the large cardboard member C whereby another piece of pressure sensitive tape may hingedly secure second and subsequent cards D to the cardboard C. The movement of the conveyor 12 and feeder 16 is preferably in controlled coordination with the feeding of the tape and with the movement of the ram, although such movement could be manually coordinated.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. Apparatus for severing a piece of pressure sensitive tape from a tape strip and then applying the said piece to a surface, said apparatus comprising a frame, a ram slidably carried by said frame, knife means slidably carried by said frame, a pair of spaced members mounted on said frame for adhesively receiving said tape therebetween, said ram being aligned with said spaced members, and means for sliding said ram and said knife means against said tape between said members so that said knife means severs said tape piece from said strip, said ram removing said severed piece from one of said members and applying said piece to a surface.

2. The apparatus of claim 1 wherein the other of said members has means for cooperating with said knife means for severing said piece from said strip.

3. The apparatus of claim 1 wherein vacuum openings are provided in said ram for holding said piece to said ram after separation of said tape piece from said spaced member and before said piece is applied to a surface.

4. The apparatus of claim 1 wherein means are provided for feeding said tape strip across the space between said members after said tape piece is severed from said strip, and means are provided for assuring adherence of said strip to said members.

5. The apparatus of claim 1 wherein a rotatable member is carried by said frame, said spaced members are rotatably carried by said rotatable member, and means are provided for rotating said rotatable member after said tape piece has been applied to a surface, said tape being pulled by one of said spaced members and being applied to the other of said spaced members, said tape piece then being in position for the severing of an additional piece of tape from said strip.

6. The apparatus of claim 5 wherein a shaft is secured to said rotatable member and is rotatably carried by said frame, and said feeding means includes gear means for rotating said shaft and thereby said rotatable member in one direction only.

7. The device of claim 6 wherein air cylinder drive means are provided and a ratchet connection is provided between said shaft and said air cylinder means so as to impart rotation of said shaft and said rotatable member in one direction only, and switch means responsive to the return movement of said ram are provided to activate said feeding means to impart rotation to said shaft and said rotatable member.

8. The apparatus of claim 5 wherein said ram is reciprocal in a vertical direction, and means are mounted on said frame for normally maintaining said spaced members in a horizontally aligned condition.

9. The apparatus of claim 8 wherein means are mounted on said ram for pressing said tape to one of said spaced members during the downward movement of said ram so that said tape is sufficiently adhered to said one spaced member to pull said tape strip.

10. The device of claim 9 wherein means are provided on said frame for storing a roll of said tape, said pressing means causing said tape to be sufficiently adhered to said one spaced member to pull the said tape from said roll.

11. The device of claim 9 wherein drive means are provided for moving said ram in an up and down direction.

12. The device of claim 9 wherein said frame has a spring member mounted thereon for securing said tape to said one spaced member before said pressing means is moved down to assure proper adhesion of said tape to said one spaced member.

References Cited

UNITED STATES PATENTS

| | | | |
|---|---|---|---|
| 2,720,994 | 10/1955 | Arvidson | 156—517 |
| 3,359,150 | 12/1967 | Stoothoff et al. | 156—517 |

DOUGLAS J. DRUMMOND, *Primary Examiner.*